(12) United States Patent
Hosler et al.

(10) Patent No.: US 10,933,723 B2
(45) Date of Patent: Mar. 2, 2021

(54) APPARATUSES FOR REDUCING LIGHT GLARE AND RELATED METHODS

(71) Applicant: Helio Tech LLC, Arlington, TX (US)

(72) Inventors: James Hosler, Arlington, TX (US); Paige Hosler, Culver City, CA (US); Robert Bell, Culver City, CA (US)

(73) Assignee: HELIO TECH LLC, Arlington, TX (US)

( * ) Notice: Subject to any disclaimer, the term of this patent is extended or adjusted under 35 U.S.C. 154(b) by 91 days.

(21) Appl. No.: 16/444,991

(22) Filed: Jun. 18, 2019

(65) Prior Publication Data

US 2019/0389284 A1    Dec. 26, 2019

Related U.S. Application Data

(60) Provisional application No. 62/687,548, filed on Jun. 20, 2018.

(51) Int. Cl.
*B60J 3/00* (2006.01)
*B60J 3/06* (2006.01)
*B60J 3/02* (2006.01)
*B60J 3/04* (2006.01)

(52) U.S. Cl.
CPC .............. *B60J 3/06* (2013.01); *B60J 3/0208* (2013.01); *B60J 3/04* (2013.01)

(58) Field of Classification Search
CPC ...... G02C 7/12; G02B 5/3033; G02B 5/3016; G02B 5/305; G02B 27/281; C08L 29/04; B60J 3/0208; F21S 41/135; F21V 9/14; G02F 1/133502
See application file for complete search history.

(56) References Cited

U.S. PATENT DOCUMENTS

| | | | | |
|---|---|---|---|---|
| 1,574,899 A | * | 3/1926 | Kellogg | B60J 3/02 248/276.1 |
| 2,665,166 A | * | 1/1954 | Roark | B60J 3/02 296/97.9 |
| 2,755,700 A | * | 7/1956 | Ljungstrom | B60J 3/04 359/229 |
| 2,856,810 A | * | 10/1958 | Frost | G02B 27/281 359/488.01 |
| 3,870,403 A | * | 3/1975 | Ward | G02B 5/205 359/614 |
| 4,090,732 A | * | 5/1978 | Vistitsky | B60J 3/0208 296/97.11 |

(Continued)

*Primary Examiner* — Kiran B Patel
(74) *Attorney, Agent, or Firm* — Stoel Rives LLP

(57) ABSTRACT

Disclosed are light glare reducing apparatuses and related methods. A light glare reducing apparatus includes a first polarized body, a second polarized body, and a movable coupling that attaches the second polarized body to the first polarized body with the second polarized body at least partially overlapping the first polarized body. The first polarized body includes a first polarized material that is optically polarized in a first direction relative to the first polarized body. The second polarized body includes a second polarized material that is optically polarized in a second direction relative to the second polarized body. The movable coupling is configured to enable the second polarized body to move relative to the first polarized body to change an angle of the second direction relative to the first direction.

19 Claims, 5 Drawing Sheets

(56) References Cited

U.S. PATENT DOCUMENTS

| | | | | |
|---|---|---|---|---|
| 4,317,589 A * | 3/1982 | Kuss | B60J 3/0208 | 296/97.6 |
| 4,526,415 A * | 7/1985 | Jardine | B60J 3/0208 | 160/DIG. 3 |
| 5,611,591 A * | 3/1997 | Van Devender | B60J 3/0208 | 296/97.6 |
| 5,810,419 A * | 9/1998 | Lam | B60J 3/0204 | 296/97.1 |
| 5,860,735 A * | 1/1999 | Keech | F21V 5/04 | 362/507 |
| 6,089,643 A * | 7/2000 | Wang | B60J 3/0208 | 296/97.2 |
| 6,224,137 B1 * | 5/2001 | Hunker | B60J 3/0208 | 24/562 |
| 6,309,004 B1 * | 10/2001 | McNutt | B60J 3/0208 | 296/97.6 |
| 6,325,442 B1 * | 12/2001 | Hunker | B60J 3/0208 | 296/97.1 |
| 6,402,221 B1 * | 6/2002 | Ogunjobi | B60J 3/0208 | 296/97.11 |
| 6,412,850 B1 * | 7/2002 | Francis | B60J 3/0208 | 296/97.6 |
| 6,981,733 B1 * | 1/2006 | Driscoll | B60J 3/02 | 296/97.6 |
| 7,090,281 B2 * | 8/2006 | Davey | B60J 3/0239 | 296/97.11 |
| 7,322,632 B1 * | 1/2008 | Marszalek | B60J 3/02 | 296/97.7 |
| 7,413,233 B1 * | 8/2008 | Jung | B60R 11/0235 | 296/97.7 |
| 7,513,560 B2 * | 4/2009 | Lin | B60J 3/0204 | 296/97.2 |
| 7,686,372 B2 * | 3/2010 | Suzuki | B60J 3/02 | 296/97.4 |
| 7,954,875 B2 * | 6/2011 | Bohner | B60J 3/0213 | 296/97.13 |
| 7,992,918 B2 * | 8/2011 | Mac | B60J 3/023 | 296/97.9 |
| 8,708,395 B1 * | 4/2014 | Kim | B60J 3/0208 | 296/97.5 |
| 9,073,409 B1 * | 7/2015 | Damari | B60J 3/0234 | |
| 9,375,997 B2 * | 6/2016 | Tamuraya | B60J 3/0278 | |
| 10,343,499 B2 * | 7/2019 | Feinstein | B60J 3/0234 | |
| 10,486,507 B2 * | 11/2019 | Soga | B60J 3/0252 | |
| 2002/0171256 A1 * | 11/2002 | Ward | B60R 1/083 | 296/97.7 |
| 2008/0315616 A1 * | 12/2008 | Wang | B60J 3/0208 | 296/97.6 |
| 2009/0058126 A1 * | 3/2009 | Broude | B60J 3/04 | 296/97.2 |
| 2009/0266855 A1 * | 10/2009 | Stephens | B60R 7/05 | 224/312 |
| 2010/0090494 A1 * | 4/2010 | Marcus | B60J 3/0282 | 296/97.5 |
| 2011/0001332 A1 * | 1/2011 | Weber | B60J 3/0208 | 296/97.6 |
| 2012/0292941 A1 * | 11/2012 | Bills | B60J 1/2011 | 296/97.2 |
| 2013/0001977 A1 * | 1/2013 | Marcus | B60J 3/0208 | 296/97.6 |
| 2013/0321915 A1 * | 12/2013 | Chien | B32B 17/064 | 359/485.03 |
| 2014/0239664 A1 * | 8/2014 | Newman | B60J 3/02 | 296/97.2 |
| 2014/0239665 A1 * | 8/2014 | Goodwin | B60J 3/0208 | 296/97.6 |
| 2018/0009295 A1 * | 1/2018 | Jalpa | B60J 3/06 | |
| 2020/0133390 A1 * | 4/2020 | Patton | G06F 3/013 | |

* cited by examiner

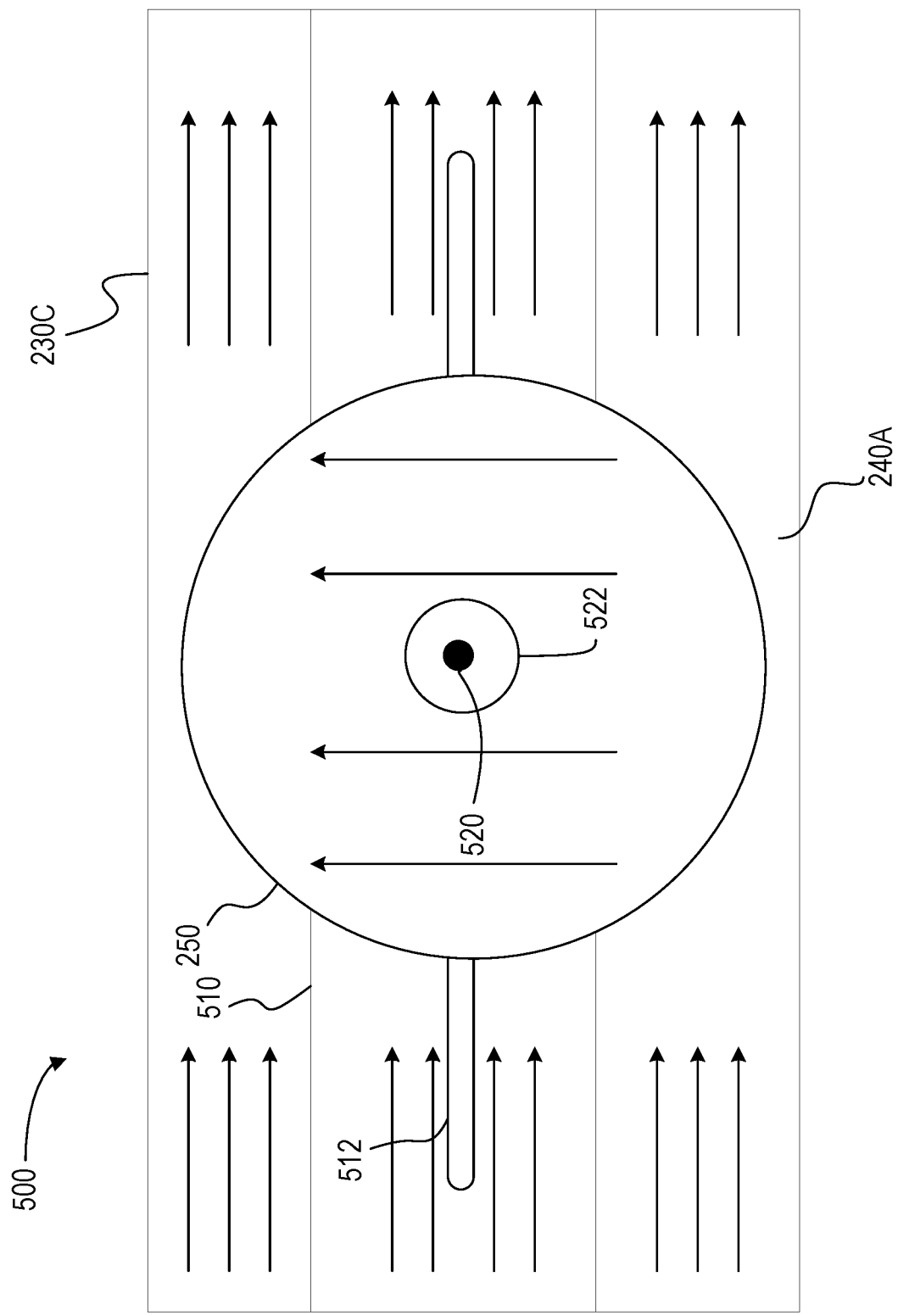

APPARATUSES FOR REDUCING LIGHT GLARE AND RELATED METHODS

CROSS-REFERENCE TO RELATED APPLICATIONS

This patent application claims priority to U.S. patent application Ser. No. 62/687,548 entitled APPARATUSES FOR REDUCING LIGHT GLARE AND RELATED METHODS, filed Jun. 20, 2018, which is incorporated herein by reference in its entirety.

BACKGROUND

Technical Field

The disclosure relates generally to apparatuses for reducing light glare and related methods, and more specifically to adjustable light glare reduction for vehicular applications.

Background

Optically polarized materials are widely used to filter light such that a portion of light that is polarized in the same direction as the polarization of the polarized materials is filtered out. One such application is the use of polarized lenses in sunglasses. Polarized lenses prevent a portion of the light striking the lenses from passing through the lenses to the eyes of the wearer, reducing glare that reaches the eyes of the user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a simplified illustration of a polarized optical system, according to some embodiments.

DETAILED DESCRIPTION OF PREFERRED EMBODIMENTS

Figure 1:
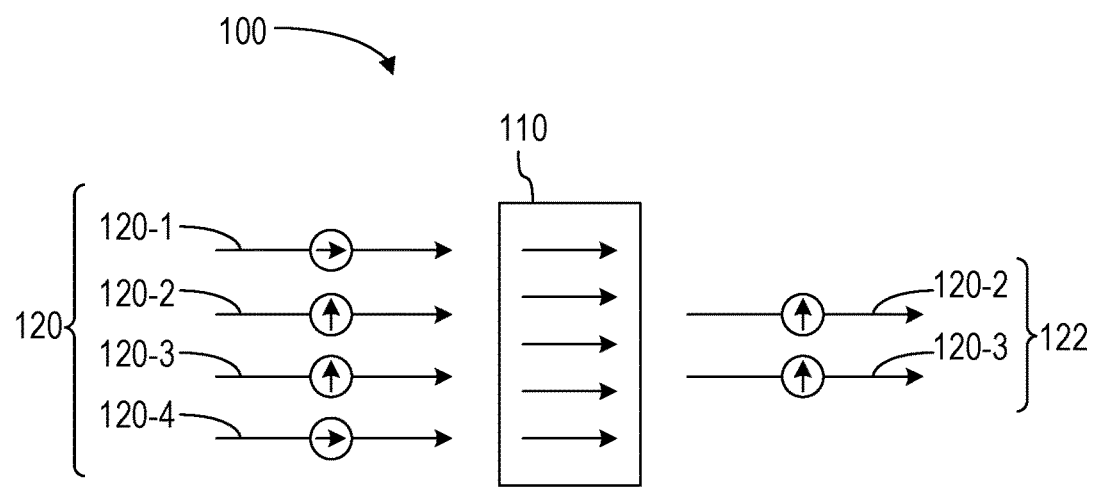
FIG. 1 is a simplified illustration of a polarized optical system.

Some environments that are influenced by glare from the sun and other light sources are vehicles (e.g., automobiles, boats, planes, and other vehicles). Automobiles are often equipped with visors to block some of the light that would otherwise enter through windows of the automobiles, preventing the light from impairing a driver's and/or passengers' vision. These visors are relatively limited, however, both in size and in their range of motion. As a result, if glare from the sun, reflections of sunlight, or other light sources cannot be blocked by a visor, the visor may be insufficient to prevent the partial or complete visual impairment that can result from such glare.

Disclosed herein are light glare reducing apparatuses and related methods. In some embodiments, a light glare reducing apparatus includes a first polarized body, a second polarized body, and a movable coupling. The first polarized body includes a first polarized material that is optically polarized in a first direction relative to the first polarized body. The second polarized body includes a second polarized material that is optically polarized in a second direction relative to the second polarized body. The movable coupling attaches the second polarized body to the first polarized body with the second polarized body at least partially overlapping the first polarized body. The movable coupling is configured to enable the second polarized body to move relative to the first polarized body to change an angle of the second direction relative to the first direction.

In some embodiments, a light glare reducing apparatus includes a first polarized body, one or more clips, a second polarized body, and a coupling mechanism. The first polarized body includes a first face and a second face opposite the first face. The first face and the second face are substantially planar and substantially parallel to each other. The first polarized body includes a first optically polarized material that is linearly polarized in a first direction. The one or more clips are configured to attach the first polarized body to a visor of a vehicle. The second polarized body includes a second optically polarized material that is linearly polarized in a second direction. The coupling mechanism is coupled to the first polarized body and the second polarized body with the second polarized body at least partially overlapping the first polarized body. The coupling mechanism is also configured to enable the second polarized body to rotate around an axis of the second polarized body to enable adjustable variance of an angle between the second direction and the first direction.

In some embodiments, a method of manufacturing a light glare reducing apparatus includes polarizing a first body to produce a first polarized body, polarizing a second body to produce a second polarized body, and attaching the second polarized body to the first polarized body using a rotational axis.

As used herein, the term "substantially" indicates a degree of precision within a threshold level of exactness. For example, "substantially" may indicate a degree of precision within ten percent (10%), five percent (5%), three percent (3%), one percent (1%), or even fractions of one percent of exactness.

FIG. 1 is a simplified illustration of a polarized optical system 100. The polarized optical system includes an optically polarized material 110. As used herein, the term "optically polarized material" refers to a material that is itself optically polarized, or includes one or more optically polarized film therein or thereon (e.g., an optically polarized film covering a transparent or translucent material such as a plastic or a glass). An optically polarized material functions as a filter to absorb some or all components of electromagnetic radiation (e.g., light) that are polarized in the same direction as the polarization of the optically polarized material when the light passes through the optically polarized material.

To illustrate how optically polarized materials function, the optically polarized material 110 of FIG. 1 is shown (using the arrows within the optically polarized material 110 of FIG. 1) as having a horizontal polarization. Light 120 including horizontally polarized components 120-1, 120-4 and vertically polarized components 120-2, 120-3 is shown in FIG. 1 traveling towards the optically polarized material 110. Since the polarization of the horizontally polarized components 120-1, 120-4 and the polarization of the optically polarized material 110 are in the same direction (i.e., horizontal), the optically polarized material 110 absorbs the horizontally polarized components 120-1, 120-4. As a result, light 122 exiting the optically polarized material 110 includes the vertically polarized components 120-2, 120-3 and not the horizontally polarized components 120-1, 120-4.

Figure 2:
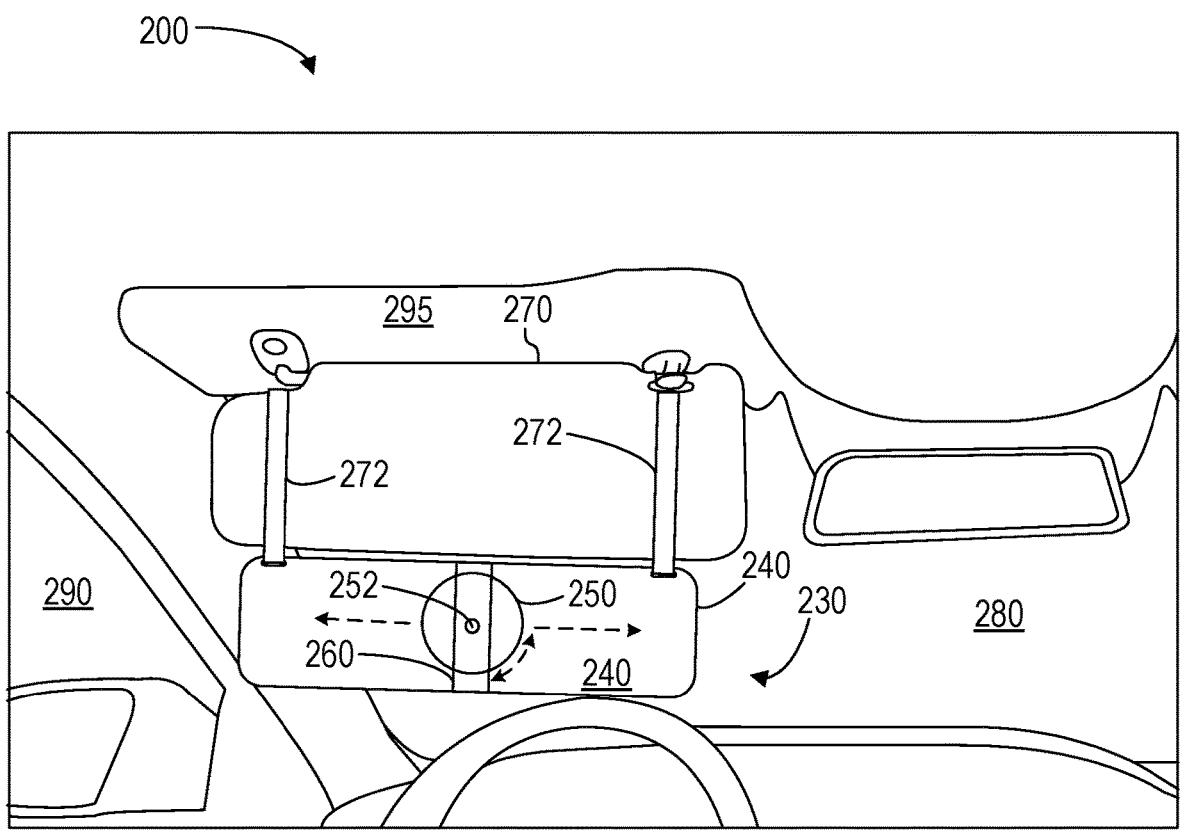
FIG. 2 is a simplified illustration of a portion of an interior of an automobile, according to some embodiments.

FIG. 2 is a simplified illustration of a portion of an interior 200 of an automobile, according to some embodiments. A light glare reducing apparatus 230 attached to a sun visor 270 of the automobile is illustrated in FIG. 2. The light glare reducing apparatus 230 includes a first polarized body 240, a second polarized body 250, and a movable coupling 260 (sometimes also referred to herein as "coupling mechanism" 260). In some embodiments, the first polarized body 240 includes a substantially planar first polarized body. The first polarized body 240 includes a first optically polarized material that is optically polarized in a first direction relative to the first polarized body 240. By way of non-limiting example, the first polarized body 240 may be horizontally polarized, similarly to the optically polarized material 110 of FIG. 1. This horizontal polarization may prevent glare from light sources reflecting off of horizontal surfaces and entering the automobile through a windshield 280 or side window 290 of the automobile from impairing the vision of a driver of the automobile. It will be understood, however, that the first polarized body 240 may instead be polarized in any non-horizontal direction (e.g., vertically or non-vertically polarized) without departing from the scope of the disclosure.

The second polarized body 250 includes a second optically polarized material that is optically polarized in a second direction relative to the second polarized body 250. In some embodiments, the second polarized body 250 is circularly shaped, as illustrated in FIG. 2. The disclosure is not, however, so limiting. It is contemplated within the scope of the disclosure that the second polarized body 250 may take on any shape (e.g., two-dimensional or three-dimensional shapes).

The movable coupling 260 attaches the second polarized body 250 to the first polarized body 240. The movable coupling 260 is also configured to enable the second polarized body 250 to move relative to the first polarized body 240 to change an angle of the second direction relative to the first direction. By way of non-limiting example, the movable coupling 260 may be coupled to a rotational axis 252 of the second polarized body 250 to enable the second polarized body 250 to rotate on the rotational axis 252 (rotation of the second polarized body 250 is indicated using arrows drawn with broken lines). As the second polarized body 250 rotates, the angle of the second direction of polarization of the second polarized body 250 with respect to the first direction of polarization of the first polarized body 240 changes. As a result, rotating the second polarized body 250 increases or decreases the amount of light that is absorbed by the light glare reducing apparatus 230 in locations where the first polarized body 240 overlaps with the second polarized body 250. In some embodiments, the coupling mechanism 260 is further configured to enable the second polarized body 250 to rotate such that the angle between the first direction (the direction of polarization of the first polarized body 240) and the second direction (the direction of polarization of the second polarized body) varies at least between about zero degrees (0°) and ninety degrees (90°). More detail regarding the rotation of the second polarized body 250 will be discussed below with reference to FIGS. 3A through 5.

In some embodiments, the movable coupling 260 may also be configured to enable the second polarized body 250 to move relative to the first polarized body 240 without changing an angle of the second direction relative to the first direction. By way of non-limiting example, the movable coupling 260 may be configured to enable the second polarized body 250 to move from side-to-side (as indicated using arrows drawn with broken lines in FIG. 2) and/or from top to bottom (not shown). The source of light glare may move from one location to another on the light glare reducing apparatus 230, from the perception of the driver. The ability to move the second polarized body 250 to different locations on the light glare reducing apparatus makes it so that the second polarized body 250 can be moved to any location on the light glare reducing apparatus 230 where the source of light glare is perceived.

In some embodiments, the coupling mechanism 260 includes a tab coupling the axis 252 of the second polarized body 250 to at least one edge of the first polarized body 240. The tab is configured to slide along the at least one edge of the first polarized body 240 to enable the second polarized body 250 to move relative to the first polarized body 240. In some embodiments, the tab wraps completely around the first polarized body 240. In some embodiments, the coupling mechanism 260 comprises a translucent or transparent material.

In some embodiments, the light glare reducing apparatus 230 includes one or more attachment mechanisms 272 configured to attach the first polarized body 240 to the sun visor 270 of the automobile. By way of non-limiting example, the one or more attachment mechanisms 272 may include one or more clips (e.g., alligator clips, friction inducing clips, etc.), tabs, cords, bands, straps, buckles, other attachment mechanisms, or combinations thereof. In some embodiments, the one or more attachment mechanisms 272 are configured to enable the first polarized body 240 to move relative to the sun visor 270 of the automobile (e.g., hinged motion, lateral motion, etc.). In other words, the movable coupling 260 is configured to enable the second polarized body 250 to traverse a front surface 242 of the first polarized body 240. In some embodiments, the one or more attachment mechanisms 272 are configured to enable the light glare reducing apparatus 230 to be folded flat against the sun visor 270 and stowed against a ceiling 295 of the automobile or a bottom face of the sun visor 270 when the light glare reducing apparatus 230 is not in use. In some embodiments, however, the light glare reducing apparatus 230 may replace the sun visor 270 of the automobile. In such embodiments, the light glare reducing apparatus 230 may be a light glare reducing sun visor of the automobile that attaches to the automobile (e.g., to the ceiling of the automobile using a similar coupling as that of the sun visor 270).

In some embodiments, the first polarized body 240 includes a first face (e.g., the front surface 242) and a second face opposite the first face (e.g., a back surface, not shown). In some embodiments, the first face and the second face are substantially planar and substantially parallel to each other.

In some embodiments, at least one of the first polarized body 240 or the second polarized body 250 includes a polyvinyl chloride (PVC) material. In some embodiments, the at least one of the first polarized body 240 or the second polarized body 250 includes a polarized film on the PVC material. In some embodiments, the PVC material itself is optically polarized.

Figure 3B:
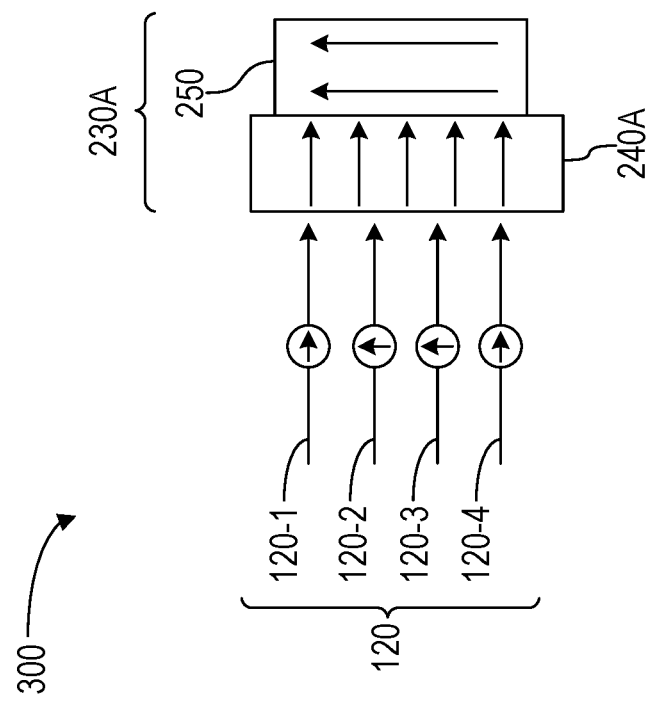
FIGS. 3A and 3B are simplified illustrations of a polarized optical system, according to some embodiments.
Figure 3A:
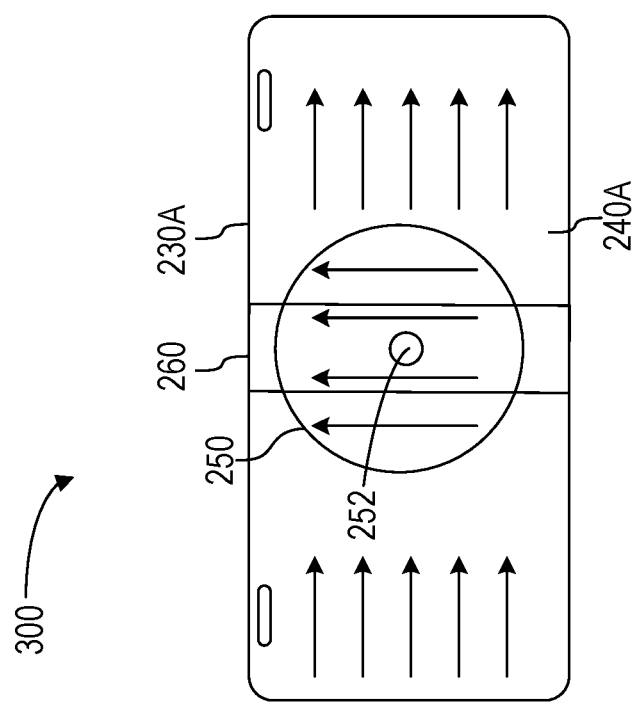

FIGS. 3A and 3B are simplified illustrations of a polarized optical system 300, according to some embodiments. FIG. 3A is a simplified front view of a light glare reducing apparatus 230A, and FIG. 3B is a simplified side view of the light glare reducing apparatus 230A.

Referring to FIGS. 3A and 3B together, the light glare reducing apparatus 230A includes a horizontally polarized first polarized body 240A similar to the first polarized body 240 discussed with reference to FIG. 2. The light glare reducing apparatus 230A also includes the second polarized body 250 coupled to the first polarized body 240A by the movable coupling 260, as discussed above with reference to FIG. 2. As illustrated in FIGS. 3A and 3B, the second polarized body 250 is rotated about the rotatable axis 252 such that the direction of polarization of the second polarized body 250 is vertical (i.e., perpendicular to that of the direction of polarization of the first polarized body 240A).

As illustrated in FIG. 3B, since the directions of polarization of the first polarized body 240A and the second polarized body 250 are horizontal and vertical, respectively, both horizontal components 120-1, 120-4 and vertical components 120-2, 120-3 of light 120 entering the light glare reducing apparatus 230A will be absorbed. As a result, in this configuration none of the light 120 will pass through the light glare reducing apparatus 230A.

Figure 4B:
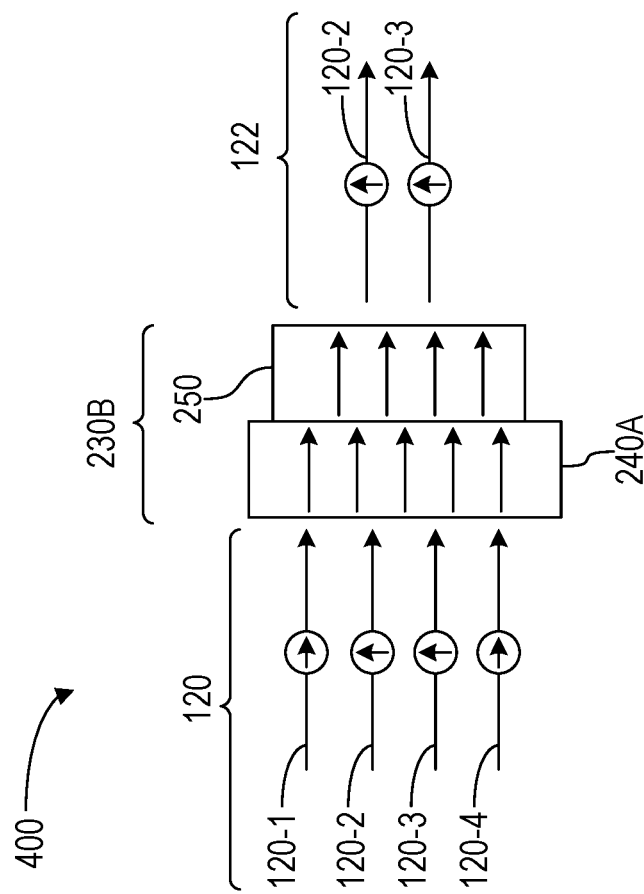
FIGS. 4A and 4B are simplified illustrations of a polarized optical system, according to some embodiments.
Figure 4A:
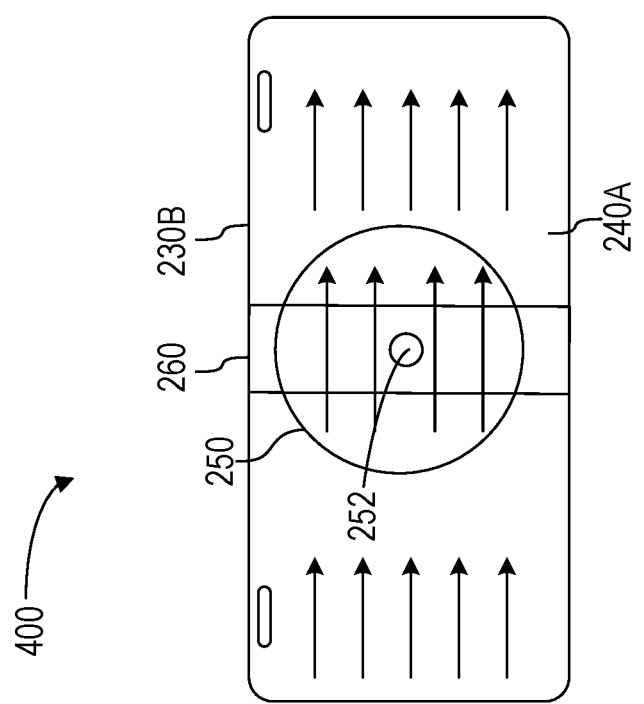

FIGS. 4A and 4B are simplified illustrations of a polarized optical system 400, according to some embodiments. FIG. 4A is a simplified front view of the light glare reducing apparatus 230B, and FIG. 4B is a simplified side view of the light glare reducing apparatus 230B.

Referring to FIGS. 4A and 4B together, the light glare reducing apparatus 230B includes the horizontally polarized first polarized body 240A discussed above with reference to FIGS. 3A and 3B. The light glare reducing apparatus 230B also includes the second polarized body 250 coupled to the first polarized body 240A by the movable coupling 260, as discussed above with reference to FIG. 2. As illustrated in FIGS. 4A and 4B, the second polarized body 250 is rotated about the rotatable axis 252 such that the direction of polarization of the second polarized body 250 is horizontal (i.e., parallel to that of the direction of polarization of the first polarized body 240A).

As illustrated in FIG. 4B, since the directions of polarization of the first polarized body 240A and the second polarized body 250 are both horizontal, only the horizontal components 120-1, 120-4 of light 120 entering the light glare reducing apparatus 230B will be absorbed. As a result, in this configuration only the vertically polarized components 120-2, 120-3 of the light 120 will pass through the light glare reducing apparatus 230B, and not the horizontally polarized components 120-1, 120-4. Accordingly, the light 122 that exits the light glare reducing apparatus 130B includes the vertically polarized components 120-2, 120-3 of the light 120.

FIG. 5 is a simplified illustration of a polarized optical system 500, according to some embodiments. FIG. 5 is a simplified front view of a light glare reducing apparatus 230C.

The light glare reducing apparatus 230C includes the horizontally polarized first polarized body 240A discussed above with reference to FIGS. 2 through 4B. Similarly, the light glare reducing apparatus 230C also includes the second polarized body 250, as discussed above with reference to FIGS. 2 through 4B. As shown in FIG. 5, the second polarized body is 150 coupled to the first polarized body 240A using a horizontal coupling 510 and a coupling assembly 520. The horizontal coupling 510 may comprise a transparent film coupled to the first polarized body 240A. In some embodiments, the horizontal coupling 510 may comprise an optically polarized material. Regardless, the portion of the first polarized body 240A covered by the horizontal coupling 510 will be polarized based at least on the polarized material of the first polarized body 240A, as shown by the horizontal arrows in FIG. 5.

As further illustrated in FIG. 5, the horizontal coupling 510 may include a slot 512 configured to receive the coupling assembly 520. The coupling assembly 520 is configured to couple the second polarized body 250 to the horizontal coupling 510 and the first polarized body 240A. For instance, the coupling assembly 520 may comprise a washer and screw assembly. Notably, while a specific example of the coupling assembly 520 is provided herein, the coupling assembly 520 may comprise any type of coupling understood by one of skill in the art that allows for coupling the second polarized body to the first polarized body 240A, rotation of the second polarized body, and horizontal movement of the second polarized body, as further described herein.

The coupling assembly 520 may also include an adjustable knob 522. In some embodiments, the coupling assembly 520 and/or the adjustable knob 522 comprise a translucent or transparent material. The adjustable knob 522 is configured to facilitate horizontal movement of the second polarized body along the length of the slot 512 of the horizontal coupling 510 with or without changing the angle of the direction of polarization of the second polarized body relative to the angle of the direction of polarization of the first polarized body 240A, as well as rotation of the second polarized body 250. As described further herein, such horizontal movement of the second polarized body 250 relative to the first polarized body 240 (i.e., horizontal movement along the length of the slot 512) may allow for reducing glare when the source of the glare has moved from one location to another on the light glare reducing apparatus 230C. In other words, the light glare reducing apparatus 230C facilitates traversal of the second polarized body 250 along a surface of the polarized body 240A to any location on the light glare reducing apparatus where the source of light glare is perceived (e.g., by a driver). As also described further herein, such rotation of the second polarized body allows for changing the angle of the direction of polarization of the second polarized body 250 relative to the direction of polarization of the first polarized body 240A. As a result, rotating the second polarized body 250 increases or decreases the amount of light that is absorbed by the light glare reducing apparatus 230C in locations where the first polarized body 240 overlaps with the second polarized body 250.

Notably, the examples of FIGS. 3A-3B and FIGS. 4A-4B illustrate the extremes where the directions of polarization of the first polarized body 240 and the second polarized body 150 are perpendicular and parallel, respectively. When the polarizations are perpendicular, the amount of the light 120 that passes through the light glare reducing apparatus 230 is at a minimum. By contrast, when the polarizations are parallel, the amount of the light 120 that passes through the light glare reducing apparatus 230 is at a maximum. In practice, the second polarized body 250 may be rotated such that the angle between the direction of polarization of the first body 240 and the direction of polarization of the second body 250 varies anywhere between perpendicular and parallel angles (i.e., 0° to 90°). The amount of light that is passed by the light glare reducing apparatus decreases as this angle increases from 0° to 90°). As a result, the amount of light that passes through the light glare reducing apparatus 230 is adjustable by rotating the second polarized body 250.

In some embodiments the second polarized body 250 may be rotated manually (i.e., by the driver or a passenger rotating the second polarized body 250 by hand). In some embodiments, the second polarized body 250 may be rotated automatically (e.g., using an electronic controller, a user interface, and an electrically controlled motor or servo for adjusting the rotation of the second polarized body 250). In some embodiments the position of the second polarized body 250 may also be adjusted manually or automatically. It will be appreciated by those of ordinary skill in the art that an electronic controller may include a processor coupled to a computer-readable storage medium having computer readable instructions stored thereon for instructing the processor to perform operational acts. In this case, the computer-readable instructions may be configured to instruct the processor to control the rotation and/or movement of the second polarized body 250 responsive to user inputs provided to the user interface.

Figure 6:
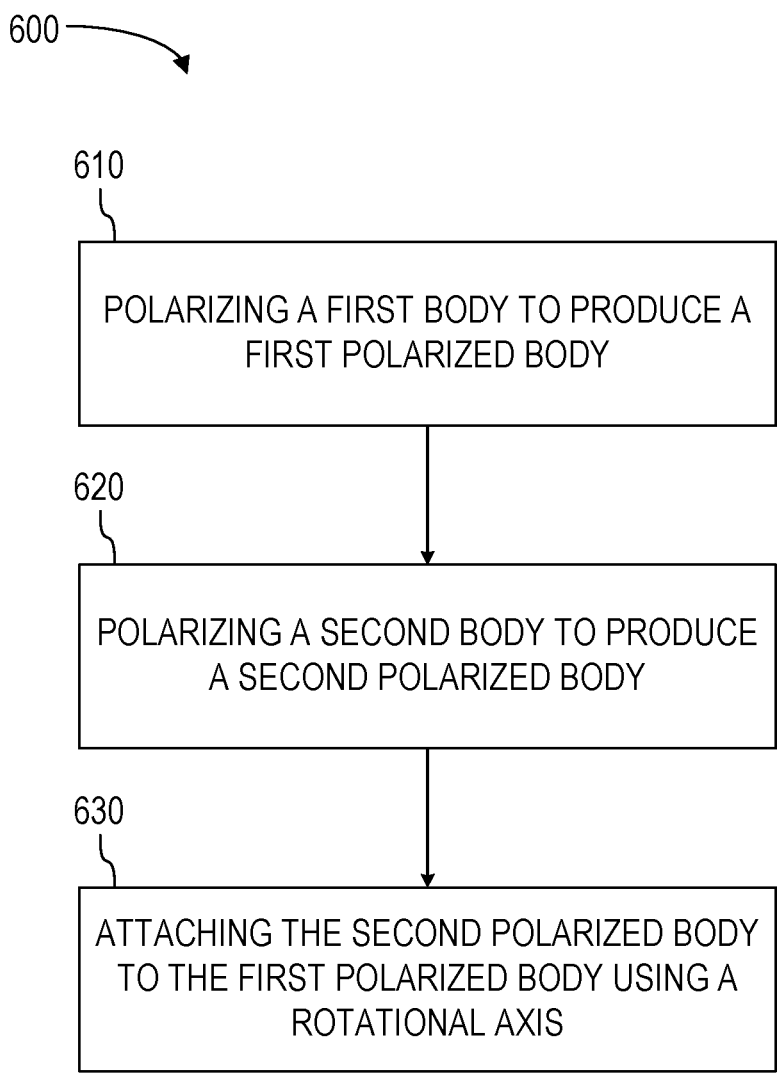
FIG. 6 is a simplified flow diagram of a method of manufacturing a light glare reducing apparatus, according to some embodiments.

FIG. 6 is a simplified flow diagram of a method 600 of manufacturing a light glare reducing apparatus (e.g., the light glare reducing apparatus 230, 230A, 230B, and 230C of FIGS. 2, 3A-3B, 4A-4B, and 5), according to some embodiments. The method 600 includes polarizing 610 a first body to produce a first polarized body (e.g., the first polarized body 240, 240A of FIGS. 2, 3A-3B, 4A-4B, and 5). The method 600 also includes polarizing 620 a second body to produce a second polarized body (e.g., the second polarized body 250 of FIGS. 2, 3A-3B, 4A-4B, and 5). The method 600 further includes attaching 630 the second polarized body to the first polarized body using a rotational axis (e.g., the rotational axis 252 of FIGS. 2, 3A-3B, and 4A-4B or the coupling assembly 520 and knob 522 of FIG. 5).

It will be understood that the order in which the elements 610-630 of the method 600 are listed is not intended to be limiting as some of these elements 610-630 may be performed in a different order without departing from the scope of the disclosure. Specifically, the elements 610-630 may be performed in any order according to embodiments of the disclosure.

It will also be understood that none of the drawings of the FIGS. of the disclosure are drawn to scale.

It will be apparent to those having skill in the art that many changes may be made to the details of the above-described embodiments without departing from the underlying principles of the disclosure. The scope of the present disclosure should, therefore, be determined only by the following claims.

What is claimed:

1. A light glare reducing apparatus, comprising:
a first polarized body comprising a first polarized material that is optically polarized in a first direction relative to the first polarized body;
a second polarized body comprising a second polarized material that is optically polarized in a second direction relative to the second polarized body; and
a movable coupling that attaches the second polarized body to the first polarized body with the second polarized body at least partially overlapping the first polarized body, the movable coupling configured to enable the second polarized body to move relative to the first polarized body to change an angle of the second direction relative to the first direction.

2. The light glare reducing apparatus of claim 1, wherein the movable coupling is also configured to enable the second polarized body to move relative to the first polarized body without changing an angle of the second direction relative to the first direction.

3. The light glare reducing apparatus of claim 1, wherein the movable coupling is configured to enable the second polarized body to rotate on an axis.

4. The light glare reducing apparatus of claim 3, wherein the movable coupling is configured to enable the second polarized body to rotate such that the second direction adjustably varies between about zero degrees (0°) and about ninety degrees (90°) relative to the first direction.

5. The light glare reducing apparatus of claim 1, wherein the movable coupling is configured to enable the second polarized body to traverse a front surface of the first polarized body.

6. The light glare reducing apparatus of claim 1, further comprising one or more attachment mechanisms configured to attach the first polarized body to a visor of a vehicle.

7. The light glare reducing apparatus of claim 6, wherein the one or more attachment mechanisms comprise one or more clips.

8. The light glare reducing apparatus of claim 6, wherein the one or more attachment mechanisms are configured to enable the first polarized body to move relative to the visor of the vehicle.

9. The light glare reducing apparatus of claim 1, wherein the first polarized body includes a film comprising a slot that is configured to receive the movable coupling and allow for horizontal movement of the second polarized body along a length of the slot.

10. The light glare reducing apparatus of claim 1, wherein the first polarized body comprises a transparent or translucent portion and a polarized film at least partially covering the transparent or translucent portion.

11. A light glare reducing apparatus, comprising:
a first polarized body including a first face and a second face opposite the first face, the first face and the second face being substantially planar and substantially parallel to each other, the first polarized body including a first optically polarized material that is linearly polarized in a first direction;
one or more clips configured to attach the first polarized body to a visor of a vehicle;
a second polarized body including a second optically polarized material that is linearly polarized in a second direction; and
a coupling mechanism coupled to the first polarized body and the second polarized body with the second polarized body at least partially overlapping the first polarized body, the coupling mechanism configured to enable the second polarized body to rotate around an axis of the second polarized body to enable adjustable variance of an angle between the second direction and the first direction.

12. The light glare reducing apparatus of claim 11, wherein the coupling mechanism is also configured to enable a position of the second polarized body to be adjusted relative to the first polarized body.

13. The light glare reducing apparatus of claim 11, wherein the coupling mechanism includes a tab coupling the axis of the second polarized body to at least one edge of the first polarized body, the tab configured to slide along the at least one edge of the first polarized body to enable the second polarized body to move relative to the first polarized body.

14. The light glare reducing apparatus of claim 13, wherein the tab comprises a translucent or transparent material.

15. The light glare reducing apparatus of claim 11, wherein the coupling mechanism is further configured to enable the second polarized body to rotate such that the angle between the first direction and the second direction varies at least between about zero degrees (0°) and ninety degrees (90°).

16. The light glare reducing apparatus of claim 11, wherein at least one of the first polarized body or the second polarized body comprises a polyvinyl chloride (PVC) material.

17. The light glare reducing apparatus of claim 16, wherein the at least one of the first polarized body or the second polarized body comprises a polarized film on the PVC material.

18. The light glare reducing apparatus of claim 16, wherein the PVC material itself is optically polarized.

19. The light glare reducing apparatus of claim 11, wherein the second polarized body is circularly shaped.

\* \* \* \* \*